3,231,513
REGENERATION OF BRASS CATALYST UTILIZING ULTRASONIC ENERGY AND CHEMICAL TREATMENT

Charles A. Graves, Los Alamitos, Donald F. Steiner, Palos Verdes Estates, and Fairbanks C. Hirdler, Los Angeles, Calif., assignors to Purex Corporation, Ltd., Lakewood, Calif., a corporation of California
No Drawing. Filed Dec. 4, 1961, Ser. No. 157,017
13 Claims. (Cl. 252—413)

This invention relates to a novel process for increasing the efficiency and prolonging the life of a catalyst and is particularly concerned with procedure for treatment of brass catalyst employed in the conversion of isopropyl alcohol to acetone, to regenerate such catalyst and increase its efficiency in such conversion process.

A well known process for the production of acetone (dimethyl ketone) comprises the passage of isopropyl alcohol over a brass catalyst in the presence of heat, to yield acetone and by-products. Such catalysts may be composed, for example, of varying amounts of copper and zinc. Specific illustrative catalysts of this type may be chosen from the S–305 series of commercially available brass alloys, e.g., one composed of about equal amounts of copper and zinc. However, other types of brass catalysts may also be employed in the above process. The catalyst is employed in a solid state.

Through use in the conversion furnace, the surfaces of the catalyst become contaminated with foreign matter, including carbonaceous material and inorganic oxides. When this occurs, the efficiency of the catalyst decreases and more thermal energy must be applied to maintain a satisfactory conversion yield. Consequently, the catalyst must be removed and either treated to increase its efficiency or be replaced by fresh new catalyst.

The treatment heretofore usually employed for regeneration of such spent catalyst included, for example, barrel tumbling the catalyst and/or treatment thereof in various aqueous solutions of acids and alkalies. However, although such treatment resulted in increasing the efficiency of the spent catalyst, after each such treatment following each production run, normal efficiency of the catalyst was decreased from the efficiency of the catalyst at the commencement of the previous run, until a point of economical depletion was reached, at which time the catalyst was discarded. Further, barrel tumbling rapidly reduces the surface area and efficiency of the catalyst by pounding and rounding off the surface irregularities, and also results in loss of catalyst through physical deterioration or attrition thereof by the tumbling action, requiring replacement of such catalyst and increasing catalyst cost. The average efficiency of the catalyst in these furnaces has been of the order of about 50% with an average furnace life of about three months, before treatments of the type noted above have been required.

It is an object of this invention to provide improved procedure for treatment of either spent or unused catalyst, so as to increase its efficiency and prolong the life of the catalyst.

Another object is the provision of procedure for substantially increasing the effective surface area of a catalyst to thereby increase the efficiency of the catalyst in use.

Still another object is to afford procedure for treatment of catalyst to increase its efficiency and prolong the active life of the catalyst, by means which produces substantially no surface damage to or physical deterioration of the catalyst, and results in essentially no loss of catalyst during such treatment.

Yet another object is to provide a catalyst treating process to alter the surface area and characteristics of the catalyst so as to substantially increase its efficiency and operating life, and which materially reduces time of treatment and the amount of chemicals required to affect such treatment, over prior art procedures.

A particular object of the invention is to provide a novel process for treatment of spent or unused brass catalyst employed in the conversion of isopropyl alcohol to acetone, so as to increase substantially the effective surface area of the catalyst, and to increase substantially the efficiency of the catalyst and to prolong its life.

Other objects and advantages will be apparent from the description below of the invention.

The invention is based on the discovery that by treating a catalyst in a bath subjected to ultrasonic radiation, and containing an agent reactive with the surface of the catalyst, the efficiency and effective life of the catalyst are markedly increased. Hence the invention procedure embodies as a novel feature the simultaneous application of ultrasonic energy and chemical treatment of the catalyst essentially to remove completely all surface and interstitial contaminants and "poisoning" agents from the surface of the catalyst, and to produce a marked increase in effective surface area of the catalyst. The activity of the catalyst is markedly increased due to the combined effect of the chemical treatment composition and the ultrasonic energy on the surface facets of the catalyst, causing a substantial increase in the total surface area of the catalyst. It has been well established heretofore that there is a substantially direct relation between the surface area of a catalyst and the quantitative yield of product produced in the process employing such catalyst. As pointed out more fully hereinafter, conventional fresh or new catalyst used in acetone production does not have a maximum surface area in the absence of treatment in accordance with the invention procedure. Prior art treatment methods have been incapable of providing the increased catalyst efficiency obtainable by the invention method. It is of particular significance that we have discovered a procedure which is effective in the treatment of previously unused catalyst to increase its efficiency and prolong its life, as well as in the treatment of so-called "spent" catalyst which has lost its commercial effectiveness as a result of prior use.

It has been determined from experience that several factors are of importance as criteria for successful operation of the invention procedure. In the first place, it has been found that the ultrasonic energy employed in catalyst treatment should be of sufficient magnitude to cause substantially complete implosion of the chemical treatment solution in which the catalyst is processed. Secondly, the chemical composition contained in the ultrasonic bath should be of a nature such that it is not only compatible with ultrasonic energy, but also designed for the specific treatment of the particular catalyst involved, so as to augment substantially the effect of the ultrasonic energy in cleaning and removing foreign matter and poisons from the catalyst surface and/or increasing the effective surface area of the catalyst. Third, the catalyst should be of such nature and possess such physical characteristics that it is substantially unaffected adversely by the cavitation produced by the ultrasonic energy.

In a preferred mode of operation, the invention process has been found to be particularly valuable for the treatment of brass catalyst, e.g. of the type employed in the conversion of isopropyl alcohol to acetone by means of heat. Accordingly, the inventoin will be described hereafter in terms of such catalyst. However, it is to be understood that the invention is not intended to be limited to treatment of such catalyst only, but that the invention principles are considered applicable to treatment of other well known catalysts employed in dehydrogenation and other types of reactions, for example, those whose catalytic activity is based on the presence of platinum, nickel, cobalt, copper, zinc, and other metals, including their oxides and salts.

As applied to the above noted brass catalyst used in production of acetone, it has been found that treatment of either spent or unused catalyst in an ultrasonic bath containing an aqueous solution of nitric acid, sulfuric acid and a soluble bichromate, preferably an alkali metal bichromate such as sodium or potassium bichromate, materially increases the efficiency and effective life of such catalyst. The bichromate and nitric acid are present in substantial proportions, and the sulfuric acid in a relatively small proportion. Such solution is herein designated Composition A. A specific typical solution found particularly effective in this respect has the following composition, designated Composition A'.

COMPOSITION A'

| | Percent by weight |
|---|---|
| $Na_2Cr_2O_7 \cdot 2H_2O$ | 29.0 |
| Nitric acid (42° Baumé) | 15.4 |
| Sulfuric acid (66° Baumé) | 4.0 |
| Water, softened or distilled | 51.6 |
| | 100.0 |

Photomicrographs of both spent and unused brass catalyst, treated employing ultrasonic energy in an aqueous bath of Composition A or A', according to the invention, indicate a marked increase in effective surface area, as compared to the same catalyst treated in various other ways for increasing the catalyst efficiency. It has been found from experience that new brass catalyst must be used several times before it reaches its peak catalytic effectiveness in the furnace. By treatment of new catalyst ultrasonically in a bath containing Composition A or A', the efficiency of the catalyst tends to rise immediately to its peak substantially without the above noted initial break-in period.

As an example of the superiority of the invention process over the prior art procedure, spent brass catalyst treated in the manner of the invention has an average efficiency in excess of 90% with an estimated life of six months or more, as compared to an average efficiency of about 50% and an average life of about three months, for the same catalyst treated by conventional procedure including, for example, barrel tumbling.

In many instances spent brass catalyst treated by the invention process attains an efficiency in excess of that of the same virgin catalyst which previously had not been used in the isopropyl alcohol to acetone conversion process.

That the application of ultrasonic energy in conjunction with a chemical treating agent such as Composition A, is required to achieve the invention results, is brought out by comparative tests on the same catalyst subjected to treatment in an aqueous solution of Composition A both with and without the application of ultrasonic energy. Such tests are described in the examples below.

The cavitation of the treating bath produced by the ultrasonic energy not only increases the effectiveness of the treatment in removal of foreign substances from the surface of the catalyst and increases effective surface area thereof, but also results in a substantial reduction in the amount of Composition A which is required to produce a comparable cleaning effect as compared to treatment of the catalyst in such composition but in the absence of ultrasonic energy. Further, since barrel tumbling, used in accordance with the prior art, is not employed in the treatment of the catalyst according to the invention, loss of catalyst by surface pounding or "smoothing out" of irregularities during such treatment is eliminated.

In a preferred mode of procedure, the brass catalyst, either spent or unused, is first treated with a solution of Composition A, or specifically A', but in the absence of any ultrasonic energy. Such solution can be a diluted solution of Composition A', such as a 50% aqueous solution thereof. This preliminary treatment functions as a preclean or presoak operation to remove initially substantial proportions of foreign matter which are relatively easily removable from the surface of the catalyst. Foreign deposits present on the catalyst surfaces in the case of the brass catalyst employed for conversion of isopropyl alcohol to acetone may include carbonaceous deposits, in addition to oxides and sulfides such as those of copper, zinc and tin. By initial treatment such as immersion of the brass catalyst in the above noted preclean or presoak solution, prior to treatment in the bath of Composition A which is simultaneously subjected to ultrasonic energy, the amount of foreign substance which is deposited in the latter bath is minimized, thus prolonging the effectiveness and life of the ultrasonic-chemical treatment bath. This initial preclean step, although not mandatory to obtain the benefits of the invention, is carried out in preferred practice chiefly to prevent early fouling of the ultrasonic-chemical treating bath.

Following initial treatment in the preclean solution to remove a portion of the foreign deposit including relatively loose material, the catalyst is rinsed with water and then treated, e.g. by immersion, in the ultrasonic treating bath containing Composition A, and preferably the specific Composition A', which, if desired, may be further diluted, e.g., about 50%, with water. The use of a diluted solution of Composition A or A' reduces the quantity of heat generated in the solution as a result of reaction of the components of Composition A or A' with the foreign matter such as copper and zinc oxides, on the surface of the catalyst.

The ultrasonic energy used to activate the bath, may have a frequency range of from about 18,000 to as high as 500,000 cycles per second. From experience it has been found that a frequency of about 18,000 to about 22,000 cycles per second produces good results. The power output of the ultrasonic unit should be maintained as high as possible. For this reason particularly, the transducer employed in the unit, which functions to produce the ultrasonic waves, is preferably a magnetostrictive device, rather than a quartz or barium titanate transducer. The power output of the transducer preferably should be at least about 6 watts per square inch, but is preferably higher, e.g. of the order of about 10 to 20 watts per square inch. However, power outputs lower than 6 watts per square inch, e.g. 4 watts per square inch, can be employed, but such lower power outputs substantially increase the period of treatment. Higher power outputs can also be employed. Although the higher such output the shorter the period of treatment in the ultrasonic bath to obtain comparable results, increased power outputs, particularly above about 20 watts per square inch, results in undesirable increased temperatures of the solution, and this factor thus tends to limit the power outputs which may be used as a practical matter. The ultrasonic energy functions, together with the chemical solution, Composition A, to completely remove all surface and particularly interstitial contaminants and "poisoning agents" from the catalyst. The ultrasonic waves produce cavitation throughout the bath, and such cavitation causes high stresses in the foreign deposits on the catalyst surface and in the fine cracks and fissures of such surface, and in conjunction with the chemical action of the components of Composition A, results in rapid disintegration of such deposits, which become dispersed in the bath. The chemical action of Composition A may also function to remove a small amount of base metal at the surface of the catalyst. The conjoint action of the ultrasonic energy and the chemical Composition A produces a marked increase in surface area of the cleaned catalyst.

For proper effectiveness of the ultrasonic-chemical treating bath, the temperature of the bath should be controlled so as not to exceed about 95° F., optimum efficiency being achieved in a temperature range of about 75° F. to about 85° F. Since the reaction of the chemical components of Composition A with the foreign deposits or contaminants on the surface of the catalyst is an exothermic reaction, and since the ultrasonic energy passed through the bath also generates some heat energy, the combination of these heat effects tends to raise the temperature of the bath. Hence cooling means, such as cooling water coils, are usually incorporated in the ultrasonic bath to maintain the temperature within the above noted temperature range.

During the operation of the ultrasonic bath, it has been found that the nitric acid present in Composition A becomes more rapidly exhausted than the other components. Hence, it is preferred to add nitric acid to the ultrasonic bath at various time intervals during operation of the bath when the activity thereof is reduced below a desired extent due to depletion of nitric acid, so as to rejuvenate the bath and increase its effectiveness. However, when the ultrasonic-chemical treating bath becomes too heavily fouled with contaminants, it is discarded and a fresh solution of Composition A substituted.

The period of treatment of the catalyst in the ultrasonic-chemical treating bath may range from about 5 to about 30 minutes.

Following treatment of the catalyst in the ultrasonic bath containing the chemical treating agents according to the invention, in preferred practice the cleaned catalyst is subjected to treatment, as by immersion, in an ultrasonic water rinse bath. Approximately the same type of transducer unit and power output are employed in the ultrasonic rinse bath as in the prior ultrasonic-chemical treatment stage. Temperature of the rinse bath is maintained at about room temperature. Since the rinse bath is normally an overflow type of bath to maintain it as clean as possible, it is usually not necessary to use any additional cooling means to maintain such tank at the desired temperature. However, the rate of overflow should be gradual and not so high as to interfere with the normal cavitation produced by the ultrasonic radiation. The ultrasonic rinse bath functions to provide the necessary cavitation to remove chemical solution A remaining in the interstices and minute cracks and fissures throughout the catalyst surface, so that the final treated catalyst is completely free of such solution. Complete removal of chemical Composition A or the components thereof from the catalyst surface is necessary in order to achieve efficient operation of the catalyst in the conversion process in which the catalyst is employed, that is, in the present instance, for conversion of isopropyl alcohol to acetone. Time of treatment in the ultrasonic rinse tank may vary from about 2 to about 5 minutes.

It has also been found that catalyst which had been previously subjected to ultrasonic-chemical treatment according to the invention, and then placed in service, requires less time for carrying out a subsequent ultrasonic-chemical treatment of the catalyst, and requires a smaller amount of treating chemicals, that is, Composition A, in such subsequent treatment than the same catalyst subjected to such subsequent treatment, but which previously had not been subjected to the ultrasonic-chemical treatment of the invention.

The following are examples of practice of the invention.

Example 1

A catalytic unit consisting of a furnace containing S–305 brass catalyst for conversion of isopropyl alcohol to acetone was placed in operation. The furnace operated at elevated temperature in excess of 300° C. During use the surfaces of the catalyst became contaminated with foreign matter, and after a period of such use when the efficiency of the catalyst had decreased substantially, the furnace was taken off stream and the catalyst was removed from the furnace for treatment.

Some of the catalyst thus removed from the furnace and designated "catalyst X" was subjected to treatment in the conventional manner for removing contaminants. This included blasting the catalyst with jets of water and air to knock off surface deposits. Following this procedure, the catalyst was introduced into a tumbling barrel containing water and the catalyst agitated in the tumbling barrel for a period of several hours, followed by rinsing. The catalyst cleaned or treated in the above manner was then replaced in the furnace.

Another portion of catalyst, designated "catalyst Y," equal in amount to that of catalyst X, and contaminated in the previous run to the same extent as catalyst X, was removed from the furnace and was first immersed in a preclean bath containing Composition A' above, diluted with an equal weight of water, that is, a 50% solution of Composition A'. After remaining in such bath for 10 minutes, such catalyst was rinsed with water, drained, and was then immersed in a tank also containing a 50% aqueous solution of Composition A', such tank being further provided with a transducer generating ultrasonic energy in the bath and operating at a frequency of about 20,000 cycles per second and having a power output of about 10 watts per square inch. The catalyst was treated in this ultrasonic bath for a period of 10 minutes, the temperature of the bath being maintained between about 75° F. and 85° F. during treatment, by passage of cooling water through coils in the tank. Following such treatment the catalyst was immersed in an overflow rinse tank containing water and provided with a transducer generating about 7 to 10 watts per square inch output of ultrasonic energy to the water in the tank. Such treatment was continued for 10 minutes, the catalyst was then removed and replaced in the furnace.

The furnace was then placed in operation again, by passing isopropyl alcohol over both catalyst X and catalyst Y, in the furnace, heated to the above noted elevated temperature, the products of the reaction being acetone or dimethyl ketone, and isopropyl alcohol. At approximately equal time intervals the yields of each of these products was determined for each of the catalysts X and Y, catalyst X being the conventionally treated catalyst and catalyst Y being the catalyst treated according to the ultrasonic-chemical treatment principles of the invention.

The product dimethyl ketone produced by catalyst Y treated to increase its efficiency by the invention process, had an average yield of about 82%, which was substantially greater than the average yield of dimethyl ketone produced by catalyst X regenerated by conventional procedure, which was about 62%. Conversely the proportions of isopropyl alcohol remaining after contact thereof with the invention treated catalyst Y was substantially smaller, averaging about 16%, in contrast to the proportions of isopropyl alcohol remaining after contact thereof with conventionally treated catalyst X, which averaged about 36%. This improvement in results is even more noteworthy when converted to ratios of dimethyl ketone to isopropyl alcohol, such ratio in the case of catalyst Y treated by the invention process being of the order of about 5:1, in contrast to a ratio of the order of less than 2:1 in the case of catalyst X regenerated conventionally.

The above results clearly show that catalyst Y treated according to the invention has a much higher sustained level of efficiency as compared to conventionally treated catalyst X.

Example 2

A batch of brass catalyst contaminated by use in a furnace for conversion of isopropyl alcohol to acetone, is subjected to treatment in a tank containing an aqueous solution of sodium bichromate, nitric acid and sulfuric acid, the solution in such tank being simultaneously subjected to ultrasonic radiation at a frequency ranging from about 18,000 to about 22,000 cycles per second, the transducer employed having a power output ranging from about 6 to about 10 watts per square inch. Treatment as described above is carried out for about 10 minutes at a bath temperature of about 85° F. Following such treatment, the catalyst is immersed in an overflow water rinse tank for a period of about 10 minutes.

The catalyst is then replaced in the furnace and used for conversion of isopropyl alcohol to acetone. Yields of acetone obtained employing such regenerated catalyst are of the order of the yields obtained from regenerated catalyst Y in Example 1, but may be slightly lower than the yields obtained from use of such catalyst Y.

*Example 3*

The average efficiency and estimated life of S-305 brass catalyst in a furnace of the type described in Example 1 for conversion of isopropyl alcohol to acetone were determined for (1) conventional catalyst decontaminated by the procedure described in Example 1 for catalyst X, (2) catalyst treated by the invention process employing ultrasonic-chemical treatment simultaneously as described for decontamination of catalyst Y in Example 1, and (3) catalyst treated in the same manner as noted under (2) above, but without the application of ultrasonic energy in the second bath containing Composition A'. The average efficiencies of the catalyst in each of the three categories above are given in the table below.

| Catalyst | Average efficiency | Estimated life |
| --- | --- | --- |
| (1) | About 50% | About 3 months. |
| (2) | About 93% | 6 months or more. |
| (3) | About 62% | About 3 months. |

It is thus seen from the above table that the average efficiency and effective life of the catalyst treated in Composition A' but without the application of ultrasonic energy—catalyst (3), was substantially increased from about 62%, and from an effective life of about 3 months, by application of ultrasonic energy to the bath containing Composition A', to an average efficiency of about 93% and an effective life of 6 or more months—catalyst (2). Further, the efficiency and effective life of catalyst (2) treated according to the invention was markedly superior to the average efficiency of about 50% and effective life of about 3 months of catalyst decontaminated in the conventional manner—catalyst (1).

The improved results achieved by the invention process indicate the following advantages of the process: (1) increased yield of product, e.g. acetone, or decreased operating costs for the same yield, through more efficient catalyst activity; (2) prolonged catalyst activity life in the furnace, minimizing costly shut-downs and greatly reducing replacement cost of catalyst; (3) a substantial reduction in the labor force required to restore spent catalyst; and (4) a substantial reduction in the amount of chemical treating agents required to treat the catalyst.

Although the invention process has been described above especially in relation to treatment of brass catalyst, used particularly in the conversion of isopropyl alcohol to acetone, it has been previously noted that the principles of the invention, involving simultaneous ultrasonic treatment in combination with chemical treatment of the catalyst to remove completely foreign deposits, can be applied to other types of catalysts employed in different processes, to accomplish removal of contaminants and promote increase in surface area of the catalyst. Each catalyst will require the use of specific chemical treating agents dependent upon the type of catalyst treated and the contaminants thereon. The basic requirements of the chemical treating agent utilized in each case are that it must be compatible for use with ultrasonic energy, and it must be capable of the desired, controlled reaction with the catalyst surfaces to attain the desired results.

A catalyst treated according to the invention procedure should have physical properties such as to prevent its disintegration by the ultrasonic energy produced during such treatment and to which the chemical treating solution and the catalyst are simultaneously subjected. Thus, the catalyst should be strong, hard and rugged, and should not be of a friable, brittle or highly porous nature which can be readily disintegrated or subject to attrition in the presence of ultrasonic energy.

Examples of solid catalysts which may be subjected to the invention process include the so-called ignited catalysts in the form of metal oxide mixtures such as mixed oxides of tungsten, molybdenum, manganese and vanadium; nickel catalyst employed for reforming of hydrocarbon gases, and platinum impregnated activated alumina utilized as an active hydrogenation catalyst for olefins and benzene, for example, in the process known as "Platforming" in the petroleum industry. The so-called precipitated and coprecipitated catalysts, e.g. chromic oxide or those composed of a combination of chromium and aluminum oxides and employed for reforming of gasoline fractions, may also be treated to increase their effectiveness and active life according to the invention.

Also the versatile class of catalysts known as Raney catalysts may be subjected to the invention process. Such catalysts include, for example, Raney iron, Raney nickel and Raney cobalt. These catalysts are generally employed in catalytic hydrogenation and reduction reactions, e.g. Raney nickel is employed in hydrogenation of unsaturated hydrocarbons.

Dehydrogenation catalysts including metallic copper, nickel, zinc and platinum, in addition to brass, as herein described, also may be subjected to treatment by the invention process to increase the effective life and efficiency of the catalyst.

Metal film and metal wire and foil catalysts may also be rejuvenated according to the invention.

In each case, as previously noted, specific chemical treating agents are required for use in conjunction with the ultrasonic energy to obtain the desired results according to the invention. These may include solutions of diverse types for the various different specific types of catalysts treated. Examples of solutions in addition to Composition A or A' above which may be effective for this purpose when applied to treatment of one or more of the above described catalysts, or other catalysts, for increasing the efficiency and effective life of such catalysts according to the invention, are solutions of hydrochloric acid, an aqueous solution of sulfuric acid and sodium bichromate, an aqueous solution of ammonium bifluoride and glacial acetic acid, phosphoric acid solutions which may contain wetting agents and organic solvents such as butyl cellosolve, and the like.

The following is an example of application of the invention process to Raney nickel catalyst.

*Example 4*

A Raney nickel catalyst prepared in the usual manner by treating a nickel-aluminum alloy with sodium hydroxide to remove the aluminum and leave the nickel, is employed in a furnace for hydrogenation of ethylenic hydrocarbons to saturated hydrocarbons.

When the efficiency of the catalyst is substantially reduced, the catalyst is placed in a tank containing an aqueous solution at about 80° F., comprising about 57% water, about 29% ammonium bifluoride and about 14% glacial acetic acid, and the solution is subjected to ultrasonic energy according to the invention. Treatment is continued for a period of about 10 minutes, following which the catalyst is removed from the tank and rinsed in an overflow water rinse tank.

The resulting catalyst has an improved efficiency and an extended effective life.

While we have described particular embodiments of our invention for purposes of illustration, it should be understood that various modifications and adaptations thereof may be made within the spirit of the invention and within the scope of the appended claims.

We claim:
1. A process for increasing the efficiency and effective life of a brass catalyst which comprises contacting catalyst with an aqueous bath agitated by ultrasonic radiation and containing an agent comprising nitric acid, sulfuric acid and a soluble bichromate, said agent being compatible with said ultrasonic energy to increase the effectiveness thereof, and said catalyst having physical characteristics such that it is substantially unaffected adversely by the cavitation resulting from said ultrasonic energy.

2. A process for increasing the efficiency and effective life of a brass catalyst, which comprises contacting the catalyst with an aqueous bath agitated by ultrasonic radiation and containing an agent comprising substantial proportions of an alkali metal bichromate and nitric acid, and a minor proportion of sulfuric acid, said agent being compatible with said ultrasonic energy to increase the effectiveness thereof, and said catalyst having physical characteristics such that it is substantially unaffected adversely by the cavitation resulting from said ultrasonic energy.

3. A process for increasing the efficiency and effective life of an S–305 brass catalyst, which comprises contacting the catalyst with an aqueous bath agitated by ultrasonic radiation and containing an agent comprising about 29 parts by weight of $Na_2Cr_2O_7 \cdot 2H_2O$, about 15 parts by weight of nitric acid based on 42 Baumé nitric acid, and about 4 parts by weight of sulfuric acid based on 66 Baumé sulfuric acid.

4. A process for increasing the efficiency and effective life of a catalyst, which comprises contacting the catalyst with an aqueous bath agitated by ultrasonic radiation having a frequency of about 18,000 to about 22,000 cycles per second and a transducer power output ranging from about 6 to about 20 watts per square inch, said bath containing an agent which reacts chemically with the surface of the catalyst, said agent being compatible with said ultrasonic energy to increase the effectiveness thereof, and said catalyst having physical characteristics such that it is substantially unaffected adversely by the cavitation resulting from said ultrasonic energy.

5. A process for increasing the efficiency and effective life of a brass catalyst, which comprises contacting the catalyst with an aqueous bath agitated by ultrasonic energy having a frequency of about 18,000 to about 22,000 cycles per second and a transducer power output ranging from about 6 to about 20 watts per square inch, said bath containing an agent comprising nitric acid, sulfuric acid, and a soluble bichromate, said agent being compatible with said ultrasonic energy to increase the effectiveness thereof, and said catalyst having physical characteristics such that it is substantially unaffected adversely by the cavitation resulting from said ultrasonic energy.

6. A process for increasing the efficiency and effective life of a brass catalyst, which comprises contacting the catalyst with an aqueous bath agitated by ultrasonic energy having a frequency of about 18,000 to about 22,000 cycles per second and a transducer power output ranging from about 6 to about 20 watts per square inch, said bath containing an agent comprising substantial proportions of an alkali metal bichromate and nitric acid, and a minor proportion of sulfuric acid, said bath being maintained at a temperature not in excess of about 95° F.

7. A process for increasing the efficiency and effective life of a brass catalyst employed in the conversion of isopropyl alcohol to acetone, and containing contaminants on the surface of said catalyst formed during such conversion process, which comprises contacting the catalyst with an aqueous bath agitated by ultrasonic energy having a frequency of about 18,000 to about 22,000 cycles per second and a transducer power output ranging from about 6 to about 20 watts per square inch, said bath containing an agent comprising substantial proportions of an alkali metal bichromate and nitric acid, and a minor proportion of sulfuric acid, said bath being maintained at a temperature not in excess of about 95° F., and contacting said catalyst with said bath for a period sufficient to remove substantially all contaminants from the surface of said catalyst and from the interstices and cracks thereof, and to increase the effective area of the surface of said catalyst.

8. A process for increasing the efficiency and effective life of a brass catalyst, which comprises contacting the catalyst with an aqueous bath agitated by ultrasonic energy having a frequency of about 18,000 to about 22,000 cycles per second and a transducer power output ranging from about 6 to about 20 watts per square inch, said bath containing an agent comprising about 29 parts by weight of $Na_2Cr_2O_7 \cdot 2H_2O$, about 15 parts by weight of nitric acid based on 42 Baumé nitric acid, and about 4 parts by weight of sulfuric acid based on 66 Baumé sulfuric acid, said bath being maintained at a temperature not in excess of about 95° F.

9. A process for increasing the efficiency and effective life of a brass catalyst, which comprises contacting the catalyst with an aqueous bath agitated by ultrasonic radiation and containing an agent comprising nitric acid, sulfuric acid, and a soluble bichromate, said agent being compatible with said ultrasonic energy to increase the effectiveness thereof, and said catalyst having physical characteristics such that it is substantially unaffected adversely by the cavitation resulting from said ultrasonic energy, and then contacting the catalyst with a water bath agitated by ultrasonic energy to rinse said agent from the surface of the catalyst and the interstices thereof.

10. A process for increasing the efficiency and effective life of a brass catalyst, which comprises contacting the catalyst with an aqueous bath agitated by ultrasonic energy having a frequency of about 18,000 to about 22,000 cycles per second and a transducer power output ranging from about 6 to about 20 watts per square inch, said bath containing an agent comprising substantial proportions of an alkali metal bichromate and nitric acid, and a minor proportion of sulfuric acid, said bath being maintained at a temperature not in excess of about 95° F., and then contacting the catalyst with a water bath agitated by ultrasonic radiation for a period sufficient to rinse said catalyst free of any of said remaining treating agent.

11. A process for increasing the efficiency and effective life of a catalyst, which comprises contacting the catalyst with an aqueous bath containing an agent comprising nitric acid, sulfuric acid and a soluble bichromate, then contacting said catalyst with an aqueous bath agitated by ultrasonic radiation and containing said agent defined above, and then contacting the catalyst with a water bath agitated by ultrasonic radiation for a period sufficient to rinse said catalyst free of any of said remaining treating agent.

12. A process for increasing the efficiency and effective life of a brass catalyst, which comprises contacting the catalyst with an aqueous bath containing an agent comprising nitric acid, sulfuric acid and a soluble bichromate, then contacting said catalyst with an aqueous bath agitated by ultrasonic radiation and containing said agent defined above, and then contacting the catalyst with a water bath agitated by ultrasonic radiation for a period sufficient to rinse said catalyst free of any of said remaining treating agent.

13. A process for increasing the efficiency and effective life of a brass catalyst employed in the conversion of isopropyl alcohol to acetone and containing contaminants on the surface of said catalyst formed during such conversion process, which comprises contacting the catalyst with an aqueous bath containing an agent comprising substantial proportions of an alkali metal bichromate and nitric acid, and a minor proportion of sulfuric acid, then contacting said catalyst with an aqueous bath agitated by ultrasonic energy having a frequency of about 18,000 to about 22,000 cycles per second and a transducer power output ranging from about 6 to about 20 watts per square inch, said last mentioned bath containing said agent defined above, said last mentioned bath being maintained at a temperature not in excess of about 95° F., and treating said catalyst in said last mentioned bath for a period sufficient to remove substantially all contaminants from the surface of said catalyst and from the interstices and cracks thereof, and then contacting the catalyst with a water bath agitated by ultrasonic radiation for a period sufficient to rinse said catalyst free of any of said remaining treating agent on the surface and in the interstices and cracks of said catalyst.

References Cited by the Examiner
UNITED STATES PATENTS 3,093,597  6/1963  Hill et al. _____ 252—411

FOREIGN PATENTS 548,960  10/1942  Great Britain.

MAURICE A. BRINDISI, *Primary Examiner.*